United States Patent [19]

Shimanaka

[11] Patent Number: 5,027,647
[45] Date of Patent: Jul. 2, 1991

[54] SENSOR MALFUNCTION DIAGNOSTIC SYSTEM FOR AUTOMATIC AUTOMOTIVE TRANSMISSION

[75] Inventor: Shigeki Shimanaka, Hadano, Japan

[73] Assignee: Nissan Motor Co., Ltd., Yokohama, Japan

[21] Appl. No.: 524,387

[22] Filed: May 17, 1990

[30] Foreign Application Priority Data

May 23, 1989 [JP] Japan .................................. 1-129892

[51] Int. Cl.$^5$ .......................................... G01M 19/00
[52] U.S. Cl. .................................. 73/118.1; 73/117.3
[58] Field of Search ........................... 73/118.1, 117.3; 340/441; 180/338; 364/424.1

[56] References Cited

U.S. PATENT DOCUMENTS 4,495,457 1/1985 Stahl .................................. 364/424.1
4,780,826 10/1988 Nakano .............................. 73/117.3

*Primary Examiner*—Jerry W. Myracle
*Attorney, Agent, or Firm*—Foley & Lardner

[57] ABSTRACT

A number of parameters representative of the vehicle operation are sampled in addition to those critical for determining the actual malfunction of the turbine sensor. In the event that the additionally sensed parameters are such as to indicate that conditions exist under which an erroneous malfunction detection is apt to occur, the diagnostic process is inhibited or alternatively, in the event that a malfunction is detected under such conditions, the malfunction indication is ignored and neither recorded in memory nor displayed.

6 Claims, 5 Drawing Sheets

SENSOR MALFUNCTION DIAGNOSTIC SYSTEM FOR AUTOMATIC AUTOMOTIVE TRANSMISSION

BACKGROUND OF THE INVENTION

1. Field of the Invention

The present invention relates generally to an automotive power unit including an automatic transmission and more specifically to a diagnostic arrangement for monitoring the operation of a sensor or sensors utilized therein.

2. Description of the Prior Art

JP-A-62-62047 discloses an automotive transmission which is electronically controlled in a manner to minimize shift shock. Data such as engine and vehicle speed are input to a A/T control unit which processes the same and generates the various necessary shift and line pressure control signals. Further, this type of transmission uses a conventional type torque converter wherein the engine torque which is input thereto, is transmitted to the transmission input shaft by the turbine. Accordingly, as the transmission input speed can vary considerably from the engine speed during various modes of operation, in order to control the transmission in the required manner it is deemed advantageous to know the rotational speed of the transmission input shaft and to be able to compare this value with the rotational speed of the output shaft.

The sensors which are used in this arrangement are provided with diagnostic and fail-safe back-up arrangements in order to obviate totally erroneous operation in the event that one or more of the sensors should suddenly begin to malfunction and supply totally erroneous data to the control unit.

For example, in the case of the turbine sensor, when the vehicle speed is above a predetermined level and the turbine sensor output indicates an abnormally low turbine rotational speed, the turbine sensor can be diagnosed as being out of order. Alternatively, in the case of the engine speed sensor indicating a high rotational speed while the turbine speed is indicated as being below a predetermined level it is possible to predict that the turbine sensor is not functioning properly.

However, with this type of diagnostic arrangement it is possible in the case the transmission is conditioned to produce neutral (such as in response to a D-N select for example) for the engine speed to be quite high (e.g. engine racing) while the turbine speed is quite low or even zero. This opens the door to the possibility of an erroneous malfunction indication. Further, in the case of a vehicle coasting and the engine speed lowers to the point where the output pressure of the oil pump drops off and permits the power train to assume a pseudo neutral condition wherein the reverse flow of torque from the driving wheels back through the transmission to the turbine does not occur, it is possible for the turbine speed to quite low while the vehicle speed is high, and again induce the situation wherein an erroneous indication that the turbine sensor is out of order, may be produced.

A further example of a situation wherein erroneous sensor diagnosis is possible occurs in the case wherein the vehicle stalls—the engine speed is high but the vehicle progress is so inhibited (e.g. extremely steep incline) that the speed is very low. Under these conditions the turbine speed will be sensed as being too low for the instant engine speed and thus the diagnostic system is apt to generates an erroneous sensor malfunction indication.

SUMMARY OF THE INVENTION

It is an object of the present invention to provide an improved diagnostic arrangement for sensors used in the above type of transmission and like devices, which obviates the chances of erroneous sensor malfunction detection for reasons of the nature set forth above.

In brief, the above object is achieved by an arrangement wherein a number of parameters representative of the vehicle operation are sampled in addition to those critical for determining the actual malfunction of the turbine sensor. In the event that the additionally sensed parameters are such as to indicate that conditions exist under which an erroneous malfunction detection is apt to occur, the diagnostic process is inhibited or alternatively, in the event that a malfunction is detected under such conditions, the malfunction indication is ignored and neither recorded in memory nor displayed.

More specifically, a first aspect of the present invention comprises a method of diagnosing sensor malfunction featuring the steps of: sampling the outputs of a plurality of sensors; using the outputs of two of said plurality of sensors to diagnose the operation of a third sensor and to determine if it is malfunctioning; and inhibiting the diagnosis if the outputs of selected sensors of the plurality of sensors indicate the existence of a mode of operation wherein an erroneous diagnosis can occur.

A second aspect of the present invention comprises a malfunction diagnostic system for a vehicle sensor featuring: means for sampling the outputs of a plurality of sensors; means for using the outputs of two of said plurality of sensors to diagnose the operation of a third sensor and to determine if it is malfunctioning; and means for inhibiting the diagnosis if the outputs of selected sensors of the plurality of sensors indicate the existence of a mode of operation wherein an erroneous diagnosis can occur.

A third aspect of the present invention comes in a method of diagnosing sensor malfunction in an automotive vehicle including an engine operatively connected to a transmission through fluid coupling means, comprising the steps of: sampling engine speed using an engine speed sensor; sampling transmission output shaft rotational speed using a vehicle speed sensor; sampling transmission input shaft rotational speed using a turbine sensor; determining turbine sensor malfunction in the event that the turbine sensor indicates a transmission input shaft rotational speed which is below a predetermined limit when one of the engine speed and the vehicle speed sensors indicates a rotational speed above a second predetermined limit; and inhibiting the sensor malfunction determination in the event that one of the engine speed sensor indicates an engine speed above a third predetermined limit and the vehicle speed sensor indicates a vehicle speed above a fourth predetermined limit.

A fourth aspect of the present invention comes in a system for diagnosing sensor malfunction in an automotive vehicle including an engine operatively connected to a transmission through fluid coupling means, the system featuring: means for sampling engine speed using an engine speed sensor; means for sampling transmission output shaft rotational speed using a vehicle speed sensor; means for sampling transmission input shaft rotational speed using a turbine sensor; means for determining turbine sensor malfunction in the event that the turbine sensor indicates a transmission input shaft rotational speed which is below a predetermined limit when one of the engine speed and the vehicle speed sensors indicates a rotational speed above a second predetermined limit; and means for inhibiting the sensor malfunction determination in the event that one of the engine speed sensor indicates an engine speed above a third predetermined limit and the vehicle speed sensor indicates a vehicle speed above a fourth predetermined limit.

A further aspect of the present invention is deemed to come in a method of diagnosing sensor malfunction in an automotive vehicle including an engine operatively connected to a transmission through fluid coupling means, the method featuring the steps of: sampling engine speed using an engine speed sensor; sampling transmission output shaft rotational speed using a vehicle speed sensor; sampling transmission input shaft rotational speed using a turbine sensor; sampling transmission gear status using a transmission inhibitor switch; sampling engine load using a idle switch; determining turbine sensor malfunction in the event that the turbine sensor indicates a transmission input shaft rotational speed which is below a first predetermined limit when one of the engine speed and the vehicle speed sensors indicates a rotational speed above a second predetermined limit; and inhibiting the sensor malfunction determination in the event that one of: the vehicle speed sensor indicates a vehicle speed below a third predetermined limit; the inhibitor switch indicates that the transmission is conditioned to produce neutral gear; the engine speed sensor indicates an engine speed below a fourth predetermined limit; and the idle switch indicates that the load on the engine is minimal and that the vehicle can be coasting.

Another aspect of the present invention is deemed to come in a system for diagnosing sensor malfunction in an automotive vehicle including an engine operatively connected to a transmission through fluid coupling means, the system featuring: means for sampling engine speed using an engine speed sensor; means for sampling transmission output shaft rotational speed using a vehicle speed sensor; means for sampling transmission input shaft rotational speed using a turbine sensor; means for sampling transmission gear status using a transmission inhibitor switch; means for sampling engine load using an idle switch; means for determining turbine sensor malfunction in the event that the turbine sensor indicates a transmission input shaft rotational speed which is below a first predetermined limit when one of the engine speed and the vehicle speed sensors indicates a rotational speed above a second predetermined limit; and means for inhibiting the sensor malfunction determination in the event that one of: the vehicle speed sensor indicates a vehicle speed below a third predetermined limit; the inhibitor switch indicates that the transmission is conditioned to produce neutral gear; the engine speed sensor indicates an engine speed below a fourth predetermined limit; and the idle switch indicates that the load on the engine is minimal and that the vehicle can be coasting.

DESCRIPTION OF THE PREFERRED EMBODIMENTS

Figure 1:
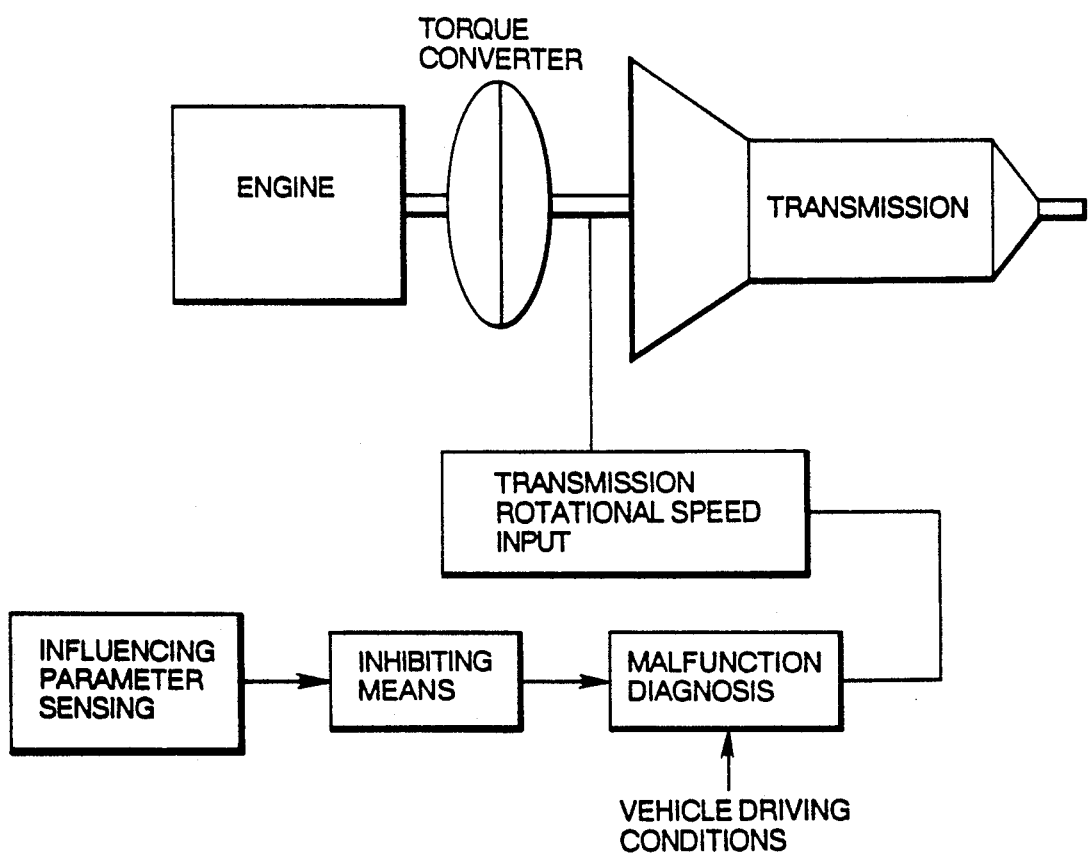
FIG. 1 is a schematic block diagram showing the conceptual arrangement of the present invention.
Figure 2:
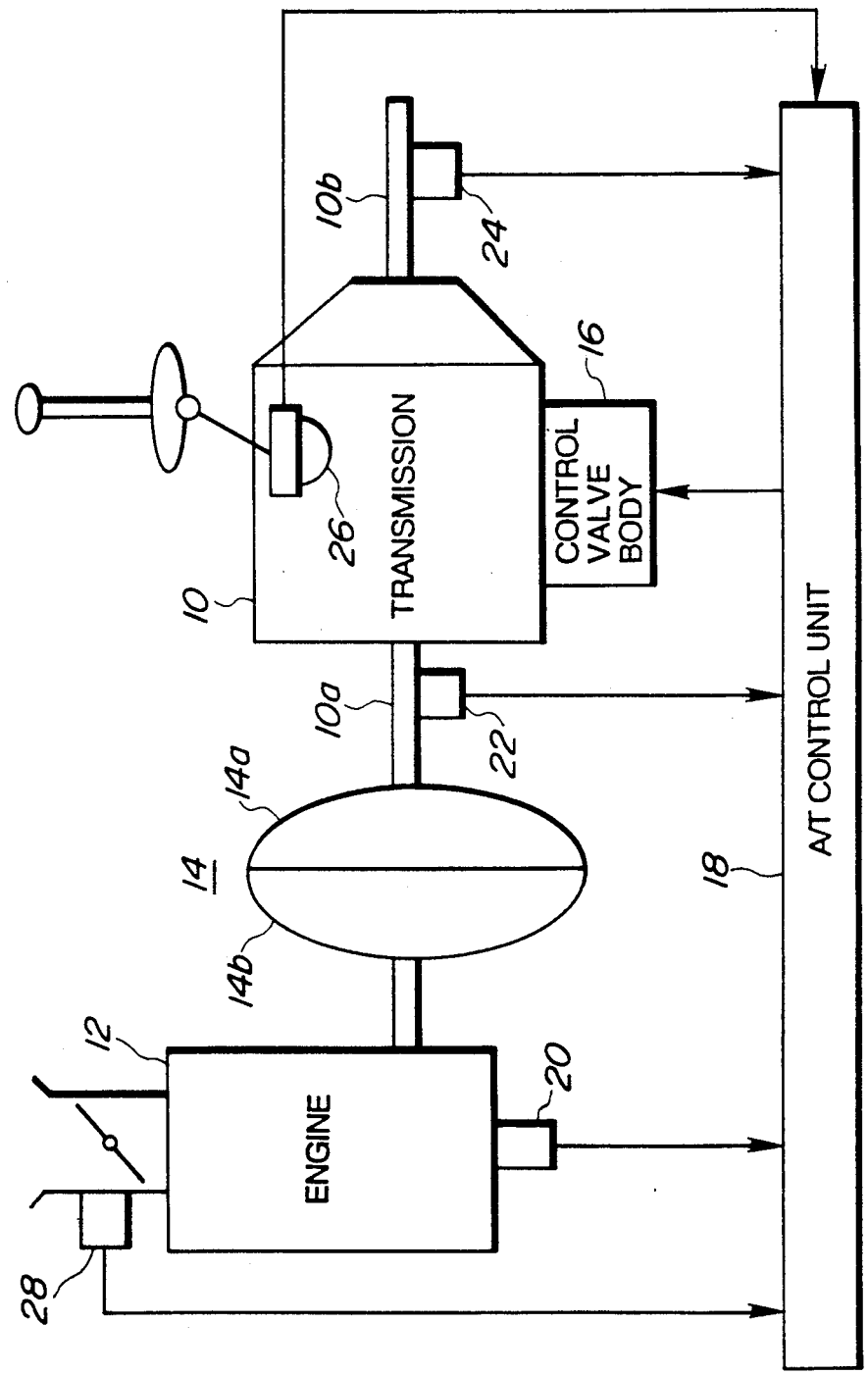
FIG. 2 is a schematic block diagram showing an automotive power unit of the nature to which the present invention is applied.

FIG. 2 schematically shows a power unit of the type to which the embodiments of the present invention are applicable.

In this arrangement a transmission 10 is shown as being operatively connected with an internal combustion engine by way of a torque converter 14. The torque converter 14 has an a pump impeller 14a connected to the output shaft of the engine, and a turbine runner 14b which is connected to an input shaft 10a of the transmission. The manner in which torque is transmitted between the impeller 14a and the turbine runner 14b is well known. Although not shown, it will be understood that the torque converter includes a stator and can be equipped with a lock-up clutch if so desired. These element have been omitted from the drawings merely for the sake of illustrative simplicity.

The rotational speed of the turbine runner 14a (hereinafter referred to as turbine speed for brevity) is indicative of the transmission input speed while the rotational speed of the transmission output shaft 10b is taken as being indicative of the vehicle speed.

A control valve body 16 is operatively connected with the transmission 10 and arranged to supply hydraulic pressure to various friction elements included therein in a manner to induce the selective engagement and release thereof and condition the transmission gear train to produce a plurality of different gear ratios. The control valve body also induces a number of solenoid valves which are controlled by a signal supplied from a A/T control unit 18.

As shown, this latter mentioned element is arranged to receive data inputs from an engine speed sensor 20, a turbine sensor 22, an output shaft rotational speed sensor 24, an inhibitor switch 26, and an idle switch 28.

Figure 3:
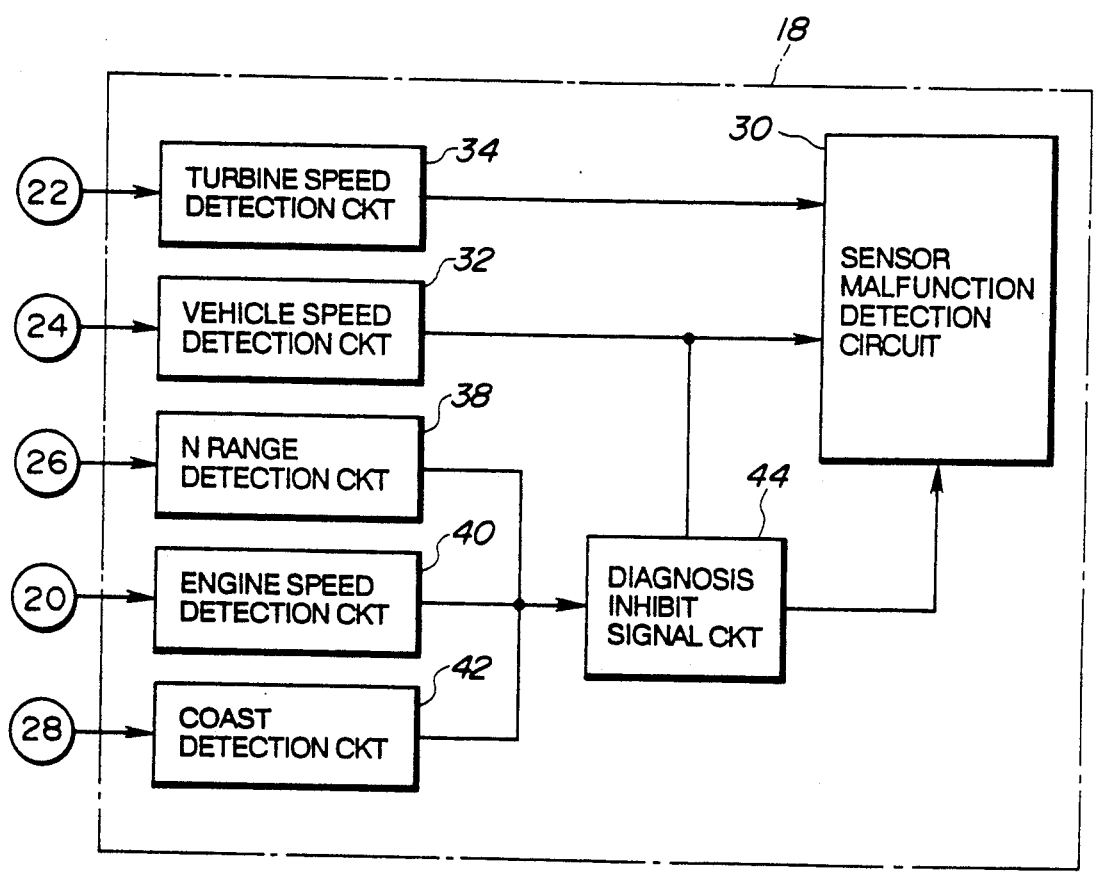
FIG. 3 is a block diagram showing the provision of an signal inhibiting circuit which characterizes a first embodiment of the present invention.

The A/T control unit 18 includes an arrangement of the nature schematically shown in FIG. 3.

This circuit includes a malfunction detection circuit 30; a vehicle speed detection circuit 32 which receives data input from the transmission output shaft rotational speed sensor; and a turbine speed determination circuit 34 which receives a data input from the turbine sensor 22. The malfunction detection circuit 30 receives vehicle speed indicative and turbine speed indicative inputs V and NT from the latter mentioned two detection circuits and is operative to determine whether the turbine sensor 22 is operating properly or not.

In order to obviate any improper malfunction indications the circuit further includes a transmission range detection circuit 38 which is arranged to receive data input from the inhibitor switch 26; an engine speed detection circuit 40 which receives data input from the engine speed sensor 20; and a coasting determination circuit 42. The output of the above mentioned three determination circuits are supplied to a inhibit signal generating circuit 44 which is in turn connected to the malfunction detection circuit 30.

In this arrangement, the range detection circuit 38 is arranged to detect the transmission shift lever being set in N position and to output a signal indicative thereof. On the other hand, the engine speed determining circuit is arranged to output a signal indicative of the engine speed being below a predetermined limit, while the coasting detection circuit is responsive to the closure of the idle switch 28 to output a signal indicative of the load on the engine having been reduced to a minimal level.

In the event that any one of the circuits 38 to 42 outputs a signal, the inhibit signal generating circuit 44 responds by outputting a signal to the sensor malfunction detection circuit 30 which inhibits the output of any diagnostic results that may be produced based on the current engine speed and turbine speed data.

Figure 4:
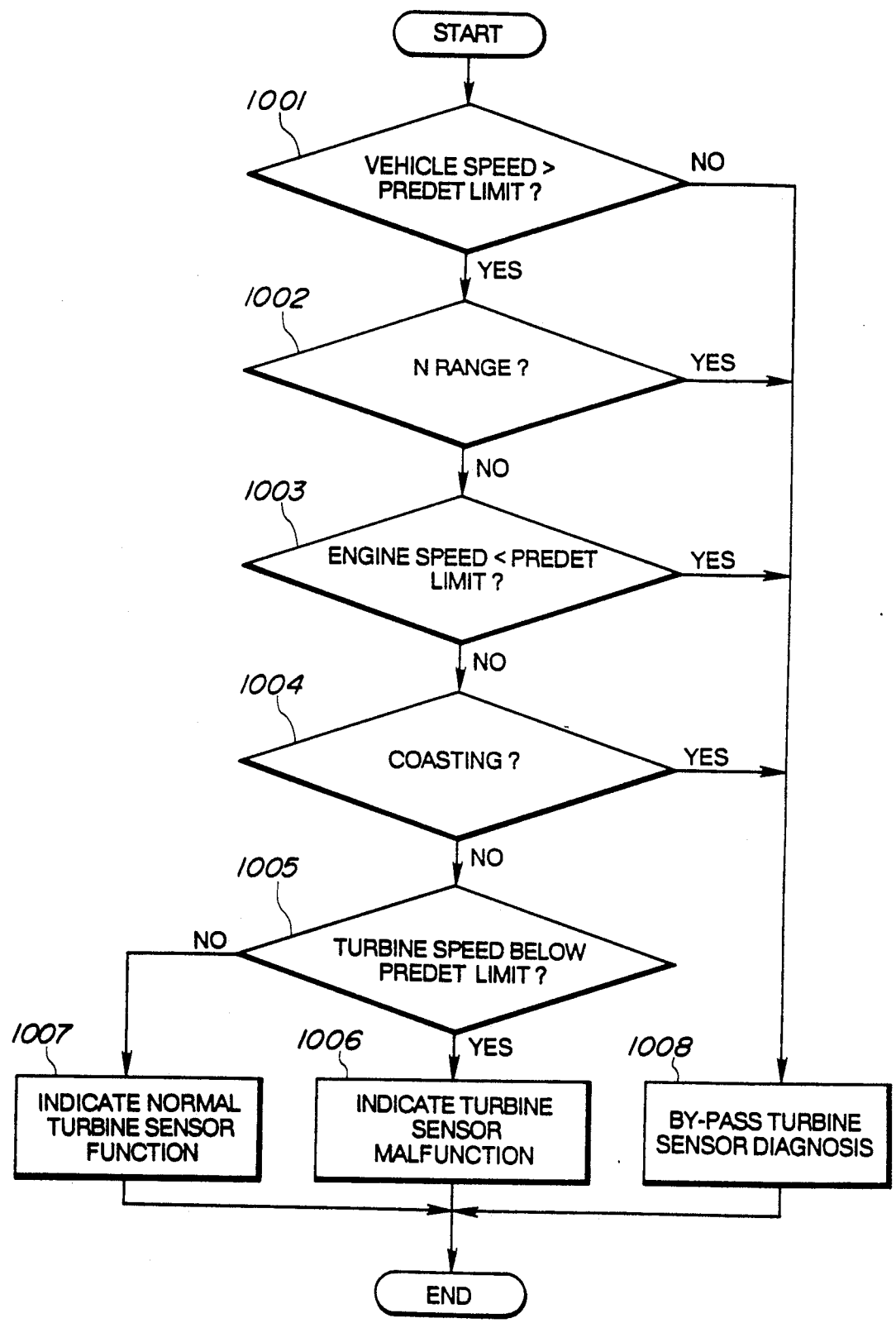
FIG. 4 is a flow chart which depicts the steps which characterize a control routine according to the first embodiment of the present invention.

FIG. 4 shows in flow chart form the steps which are executed in accordance with the first embodiment of the present invention. As will be appreciated, steps 1001 to 1004 are such as to examine the instant vehicle speed, gear range, engine speed and engine load. In the event that any of the steps 1001 to 1004 results in the routine flowing to step 1008 a diagnosis inhibit signal is produced. More specifically, if the vehicle speed is lower than a given limit, or the transmission has been manually shifted to a neutral position wherein the reverse of torque through the transmission is rendered impossible, or the engine speed is lower than a selected limit and is apt to lower the level of the line pressure in the transmission to a level which permits friction element slippage, or the load on the engine is minimal indicating that the vehicle has assumed a coasting condition at a vehicle speed which is greater than the above mentioned given limit, it is possible that conditions exist wherein an inappropriate sensor malfunction diagnosis is apt to occur. Under these conditions it is deemed wise to inhibit any decision making in connection with the operability of the turbine sensor until such time as a reliable set of operating conditions exist.

In the event that the routine flows to step 1005 the instant turbine speed is compared with a predetermined value and depending on the outcome of this comparison, the routine goes to one of steps 1006 and 1007. In the event that the turbine speed is found to be lower than the predetermined limit, the routine flows to step 1006 and induces the generation of a turbine sensor malfunction indication. That is to say, in the event that the vehicle speed is reasonably high, the transmission is not in neutral gear, the engine speed is reasonably high and the engine load does not indicate a coasting condition, then conditions exist wherein the rotational speed of the transmission input shaft should be reasonably high (i.e. above a predetermined limit in this instance) it is appropriate to predict that the turbine sensor is out of order when the output of the same is relatively low (i.e below the predetermined limit). On the other hand, if the turbine speed is above the preset limit the routine flows across to step 1007 wherein a "sensor is operating normally" type indication is induced.

Figure 5:
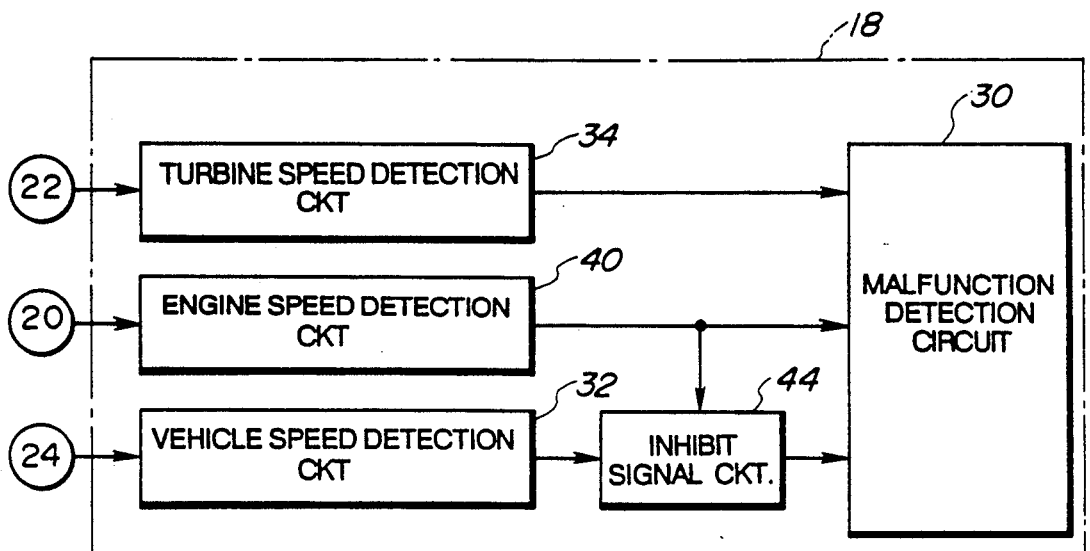
FIG. 5 is a block diagram which shows the circuit arrangement according to a second embodiment of the present invention.
Figure 6:
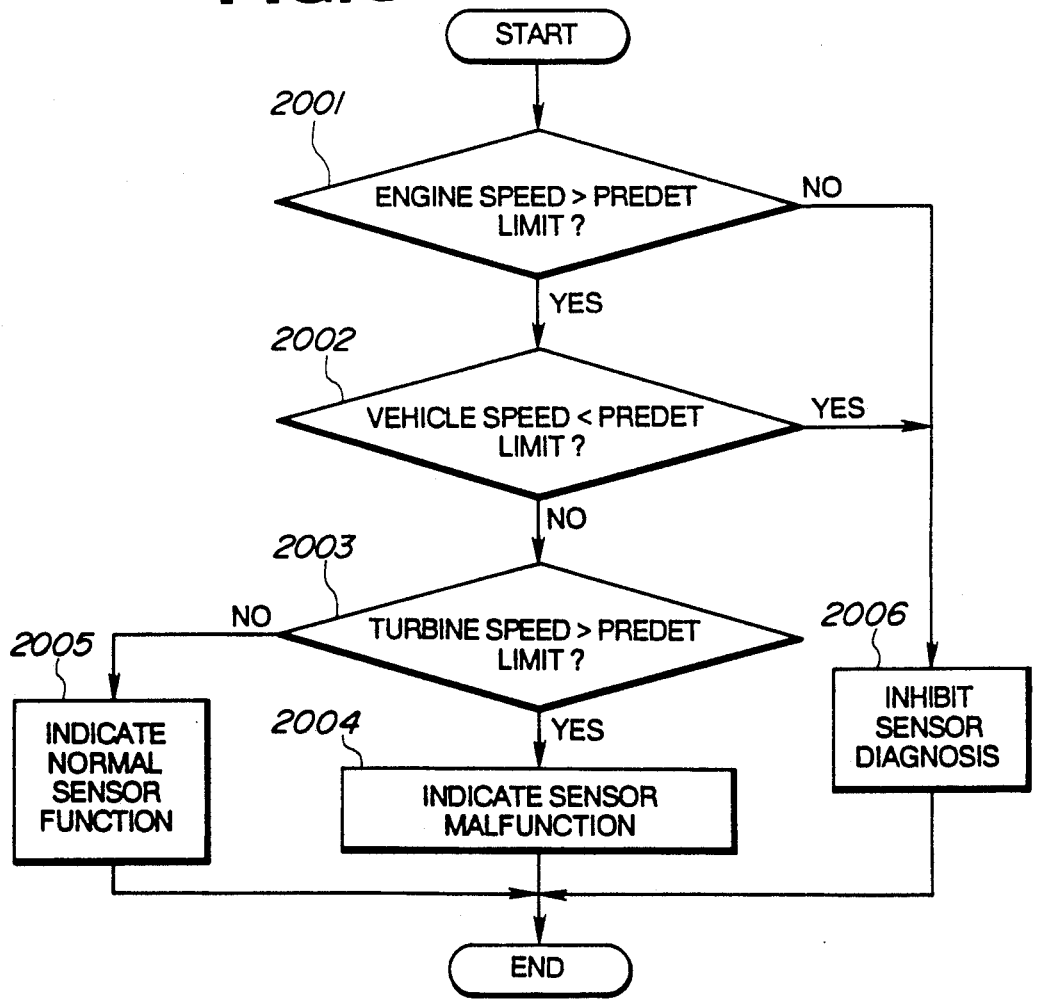
FIG. 6 is a flow chart which shows the steps which characterize the operation of the second embodiment.

FIG. 5 shows a circuit arrangement according to a second embodiment of the present invention. In this embodiment the parameters upon which the issuance of the diagnosis inhibit signal occurs is limited to vehicle and engine speed. As shown in the flow chart of FIG. 6, if the engine speed is found to be below a predetermined level in step 2001, or the vehicle speed is found to be below a given level in step 2002 the routine flows to step 2006 wherein a command to either inhibit sensor diagnosis or prevent the instant diagnosis from being issued is generated.

On the other hand, in the event that neither the engine speed nor the vehicle speed are such as to create conditions under which a improper malfunction detection can occur, the routine flows to step 2003 wherein the turbine is checked against a predetermined limit. In the event that turbine speed is abnormally low for the instant high engine and vehicle speeds the routine flows to step 2004 to issue a malfunction indication. However, if the turbine speed exhibits a level which is suitably high for the relatively high engine and vehicle speeds then the routine flows to step 2005 wherein a "sensor is functioning normally" indication is issued.

As will be appreciated, the second embodiment also screens the conditions under which the diagnosis is to be conducted and prevents the same from being executed under conditions wherein an improper indication is apt to be produced.

What is claimed is:

1. A malfunction diagnostic system for a vehicle sensor comprising:
    means for sampling the outputs of a plurality of sensors;
    means for using the outputs of two of said plurality of sensors to diagnose the operation of a third sensor and to determine if it is malfunctioning;
    means for inhibiting the diagnosis if the outputs of selected sensors of the plurality of sensors indicate the existence of a mode of operation wherein an erroneous diagnosis can occur; and
    wherein said two of said plurality of sensors comprise said engine speed sensor and said vehicle speed sensor, wherein said third sensor detects the rotational speed of an input shaft of a transmission, and wherein said selected sensors comprise said engine speed sensor and said vehicle speed sensor.

2. A malfunction diagnostic system for a vehicle sensor comprising:
    means for sampling the outputs of a plurality of sensors;
    means for using the outputs of two of said plurality of sensors to diagnose the operation of a third sensor and to determine if it is malfunctioning;
    means for inhibiting the diagnosis if the outputs of selected sensors of the plurality of sensors indicate the existence of a mode of operation wherein an erroneous diagnosis can occur;
    wherein said plurality of sensors includes an engine speed sensor and a vehicle speed sensor; and
    wherein said plurality of sensors further includes an engine load sensor which is arranged to output an indication of the load on an engine having assumed a minimal value, and a transmission gear sensor which outputs a signal indicative of which drive range a transmission is required to produce.

3. A method of diagnosing sensor malfunction in an automotive vehicle including an engine operatively connected to a transmission through fluid coupling means, comprising the steps of:
    sampling engine speed using an engine speed sensor;
    sampling transmission output shaft rotational speed using a vehicle speed sensor;

sampling transmission input shaft rotational speed using a turbine sensor;

determining turbine sensor malfunction in the event that the turbine sensor indicates a transmission input shaft rotational speed which is below a predetermined limit when one of the engine speed and the vehicle speed sensors indicates a rotational speed above a second predetermined limit; and inhibiting the sensor malfunction determination in the event that one of the engine speed sensor indicates an engine speed above a third predetermined limit and the vehicle speed sensor indicates a vehicle speed above a fourth predetermined limit.

4. A system for diagnosing sensor malfunction in an automotive vehicle including an engine operatively connected to a transmission through fluid coupling means, comprising:

means for sampling engine speed using an engine speed sensor;

means for sampling transmission output shaft rotational speed using a vehicle speed sensor;

means for sampling transmission input shaft rotational speed using a turbine sensor;

means for determining turbine sensor malfunction in the event that the turbine sensor indicates a transmission input shaft rotational speed which is below a predetermined limit when one of the engine speed and the vehicle speed sensors indicates a rotational speed above a second predetermined limit; and means for inhibiting the sensor malfunction determination in the event that one of the engine speed sensor indicates an engine speed above a third predetermined limit and the vehicle speed sensor indicates a vehicle speed above a fourth predetermined limit.

5. A method of diagnosing sensor malfunction in an automotive vehicle including an engine operatively connected to a transmission through fluid coupling means, comprising the steps of:

sampling engine speed using an engine speed sensor;

sampling transmission output shaft rotational speed using a vehicle speed sensor;

sampling transmission input shaft rotational speed using a turbine sensor;

sampling transmission gear status using a transmission inhibitor switch;

sampling engine load using an idle switch;

determining turbine sensor malfunction in the event that the turbine sensor indicates a transmission input shaft rotational speed which is below a first predetermined limit when one of the engine speed and the vehicle speed sensors indicates a rotational speed above a second predetermined limit; and inhibiting the sensor malfunction determination in the event that one of:

the vehicle speed sensor indicates a vehicle speed below a third predetermined limit;

the inhibitor switch indicates that the transmission is conditioned to produce neutral gear;

the engine speed sensor indicates an engine speed below a fourth predetermined limit; and the idle switch indicates that the load on the engine is minimal and that the vehicle can be coasting.

6. A system for diagnosing sensor malfunction in an automotive vehicle including an engine operatively connected to a transmission through fluid coupling means, comprising:

means for sampling engine speed using an engine speed sensor;

means for sampling transmission output shaft rotational speed using a vehicle speed sensor;

means for sampling transmission input shaft rotational speed using a turbine sensor;

means for sampling transmission gear status using a transmission inhibitor switch;

means for sampling engine load using an idle switch;

means for determining turbine sensor malfunction in the event that the turbine sensor indicates a transmission input shaft rotational speed which is below a first predetermined limit when one of the engine speed and the vehicle speed sensors indicates a rotational speed above a second predetermined limit; and means for inhibiting the sensor malfunction determination in the event that one of:

the vehicle speed sensor indicates a vehicle speed below a third predetermined limit;

the inhibitor switch indicates that the transmission is conditioned to produce neutral gear;

the engine speed sensor indicates an engine speed below a fourth predetermined limit; and the idle switch indicates that the load on the engine is minimal and that the vehicle can be coasting.

* * * * *